July 31, 1956 R. L. IRBY 2,756,585

DETECTION OF GAS BEARING FORMATIONS

Filed July 23, 1953

INVENTOR.
Robert L. Irby
BY
Horace B. Van Valkenburgh
ATTORNEY

United States Patent Office 2,756,585
Patented July 31, 1956

2,756,585

DETECTION OF GAS BEARING FORMATIONS

Robert L. Irby, Midland, Tex., assignor to Rotary Engineering Company, Midland, Tex., a partnership Application July 23, 1953, Serial No. 369,782

4 Claims. (Cl. 73—19)

This invention relates to the detection of gas-bearing formations, and is particularly useful in the logging of wells being drilled in an attempt to penetrate a deposit of oil or gaseous hydrocarbons.

During recent years, a practice has developed which is now quite widespread and which consists in performing various tests or operations on the mud and the cuttings returning from the bit during the drilling of a well. In conventional rotary bit practice, the bit is mounted on the lower end of a hollow drill stem, which in turn is rotated by machinery at the surface. For various purposes, including cooling and lubrication of the bit, and production of a hydrostatic pressure tending to prevent blowouts, caveins and the like, a drilling fluid or mud is pumped down the hollow drill stem, past the bit, and up the hole between the outside of the drill stem and the wall of the bore. This mud carries with it cuttings, or small portions of rock or formation material which have been removed by the bit during drilling. These cuttings may be recovered at the surface, and subjected to various tests, including a hot wire gas detection test as disclosed and claimed in the Jack E. Bliss and Olin R. Prather U. S. Patent No. 2,514,690, granted July 11, 1950, while the mud may be tested for gas intermittently, or substantially continuously, by a so-called hot wire gas detector. In addition to the gas readings taken by the hot wire detector, on both the mud and the cuttings, both the mud and the cuttings may be viewed under ultraviolet light and the cuttings may also be leached with an oil solvent, to determine whether any oil is present therein. Each sample of cuttings tested is correlated with the increment of depth in the hole, this generally being determined for the sample of cuttings which is subjected to the hot wire gas detector test. Thus, the depth from which the specimen apparently came can be determined by inserting a marking material in the mud at the drill stem, measuring the time which the material takes to pass down the drill stem and then up the bore, and subtracting the calculated time for its passage down the drill stem, the latter being determined by known formulae based on the size of the drill stem and the mud pumping rate.

In testing the mud and cuttings for gas, it is customary to take the readings at two different voltages, selected so that the temperature of the catalytic filament, used in the hot wire detector, will be sufficient at a higher voltage to tend to cause catalytic combustion of all combustible gases, including methane, which contact the filament, and at the lower voltage to tend to cause combustion of all combustible gases except methane, which contact the filament. When such readings are accurately made, a change in the ratio between the higher and lower voltage readings generally indicates that a new, fresh gas-bearing formation has been encountered. In addition, the cuttings are identified as to the type of formation, i. e., such as sand, limestone, dolomite, shale, chert, anhydrite, coal, conglomerate, sand, shale, granite, granite wash and the like, as by visual inspection or with the aid of a low power microscope, and perhaps chemical tests, such as to distinguish between limestone and dolomite. In the event that all of the cuttings apparently came from the same geological type of formation, then there can be no question but that in a new gas bearing stratum, the gas is contained in such a formation. However, in the event that there are two or more different types of formations present, it is often unknown just which one the new gas is coming from, and it is thus often desirable to ascertain just which formation the gas is coming from, even in the event that the gas bearing formation is not new. The gas detector test, as described above, does not indicate which type of formation the gas came from.

Among the objects of the present invention are to provide a novel method of detecting gas bearing formations; to provide such a method by which those formations which are gas bearing may be distinguished from those which are not gas bearing, with little difficulty; to provide such a method which may be carried out simply, yet with accuracy; to provide such a method which may be carried out concurrently or simultaneously with identification of the types of formations; to provide such a method which may also detect minute quantities of gas; to provide such a method which is particularly applicable to cuttings which are carried up the well during drilling; and to provide such a method which requires a comparative minimum of equipment. Additional objects and the novel features of this invention will become apparent from the description which follows.

In accordance with the present invention, the formations which are gas bearing may be detected by taking a sample of cuttings or material removed by the bit during the drilling, which have been carried to the top of the hole by the mud, and immersing the sample in a liquid, preferably within a housing having a transparent cover. The cuttings are preferably placed in a focusing field of a microscope, such as a low power microscope, magnifying the cuttings to a desired degree, such as ten times, and the air or gas within the housing is gradually evacuated until a sufficiently high vacuum, sometimes on the order of twenty-seven inches of mercury, is obtained. At the altitude of Midland, Texas, of approximately 2,800 feet above sea level, a vacuum of twenty-seven inches of mercury corresponds to a fraction of one pound per square inch absolute. The vacuum must be applied sufficiently gradually so that all of the gas in each particle of the cuttings, when present therein, does not tend to be removed immediately, but rather tends to be pulled out gradually, thereby forming bubbles which may cling to the gas bearing cuttings, or may form streamers of gas bubbles. In addition to observation of those cuttings from which such gas bubbles evolve during gradual application of vacuum, the location of the gas bubbles or cuttings specimens quite often indicates whether the gas is coming from intergranular or intercrystalline pores in the cuttings, or whether it is coming from cracks, vugs, or the like. Those cuttings from which the gas is coming may be identified, and this information placed on the log. This is often valuable information, since if the gas bubbles are coming from coal or shale, it is fairly obvious that a producing zone has not been encountered. Also, it is desirable to know if the gas bubbles are coming from a type of formation which is known to be sloughing into the hole from a point above the bit.

Apparatus particularly adapted to be utilized in carrying out the above method is illustrated in the accompanying drawing in which.

Figure 1:
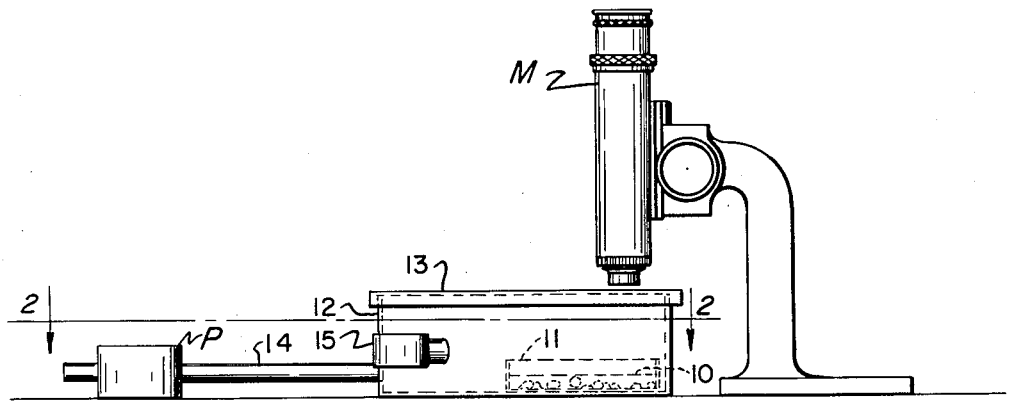
Fig. 1 is a side elevation of such apparatus.
Figure 2:
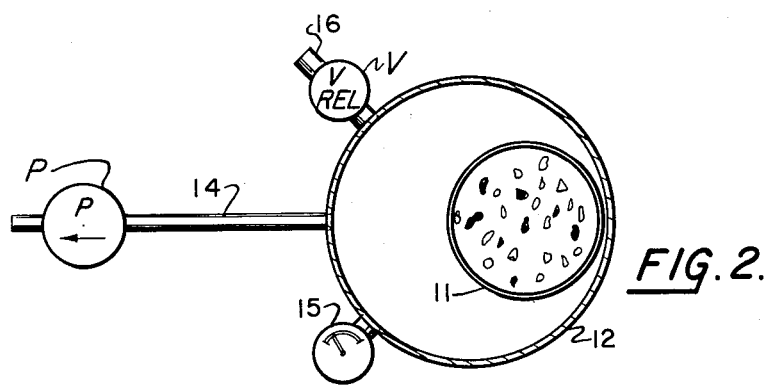
Fig. 2 is a horizontal section taken along line 2—2 of Fig. 1.

In utilizing the apparatus illustrated in the drawing, a sample of the cuttings is preferably taken which has come from a particular increment of depth of the bore, such as from a two-foot interval. The sample is separated from the mud stream, and preferably rinsed. Part of the sample may be subjected to the gas detection test, another part to the oil leach test, while still another portion of the sample, preferably representative of the sample as a whole, may be immersed in water, or other suitable liquid, such as to a depth of one-quarter inch or more, such as to the liquid level line 10 in a coaster 11. The coaster is placed in an air-tight housing 12 having a transparent removable lid 13, which is sealed to the housing during the test. A microscope M is focused on the cuttings, the microscope being conventionally provided with a lighting device which will sufficiently illuminate the cuttings. The illumination must be primarily within the visible light range, since ultraviolet light would cause only the gas bubbles to fluoresce and the specific type of cuttings from which the gas bubbles came could not be readily identified. Thus, the present method has no particular relationship to the determination of the presence or absence of petroleum in well cuttings, by immersing cuttings in a petroleum solvent and viewing the same under ultraviolet light.

A vacuum pump P is connected to the housing 12 by a vacuum line 14, and the degree of vacuum observed on a gauge 15, conveniently separately connected to the housing 12, although it may be connected to the line to the pump. In addition, an air bleed line 16 is connected to the housing, although it may be connected to the pump line, and is provided with a valve V, which may be a needle type valve or a similar type adapted to regulate the amount of air which may be sucked into the housing during operation of the pump P, so that the vacuum produced will increase only gradually. Of course, valve V, or an equivalent thereof, may be installed in the pump line to regulate the application of vacuum.

Figure 3:
Fig. 3 is an enlarged top plan view of a portion of the cuttings, as viewed through a microscope while vacuum is being gradually applied.

After the pump is started, the valve V may be closed to a point such that the vacuum increases gradually, and when a comparatively high degree of vacuum is reached, the valve V may be closed entirely so that the maximum degree of vacuum obtainable by pump P will be produced. During this time, of course, the cuttings are observed through the microscope, and if there is any gas in the cuttings, it will tend to evolve therefrom as bubbles, which may cling to the cuttings or in some instances appear as streamers, as indicated in Fig. 3. Of the cuttings in Fig. 3, the lighter cuttings are indicated as gas bearing, since bubbles of gas are evolving therefrom, and are shown as light in color to be indicative of limestone. No gas can be observed evolving from the dark shaded cuttings, which are indicative of shale, and it is therefore evident that the gas which was detected during the test, is coming from the limestone, rather than the shale. It will be noted that most of the gas bubbles merely cling to the cuttings, while some form streamers.

As will be evident, examination of the cuttings for gas, under a low power microscope, will often be of assistance in identifying the type of formation from which the cuttings came, and the apparent relative proportions of the various formations. These observations can readily be made at the same time that gas bearing cuttings are identified, and the information thus obtained placed on the log.

Recently, the foregoing method has proved to have considerable value in logging a well when a noticeable gas show in both the cuttings and the mud was indicated by the hot wire gas detector. However, shale, limestone and sand were present in apparently equal amounts in the sample of the cuttings, and no particularly noticeable change in the lithology accompanied the gas show, although there was a definite drilling break. Thus, it was doubtful as to which type of formation contained the gas. When the cuttings were examined in accordance with this invention, i. e., under the microscope while immersed in water, and a vacuum gradually applied, bubbles of gas were observed to emerge from the sand cuttings. The immediately adjacent section of the well was cored, and a gas bearing sand was recovered. In other instances, a small gas show in the mud was evident, from the hot wire detector test of the mud, and the cuttings were examined by the method of this invention. Very small bubbles were seen to emerge from beneath calcite, along small fractures in the surface. Thus, it was evident that the gas show in the mud came from a fractured formation. In addition, gas bearing formations have been identified when the amount of gas therein was insufficient to be detected by the hot wire gas detector test previously described.

It will be understood, of course, that several different types of geological formations may be represented by the cuttings and that gas may be evolved from more than one type, or even from all types. In general, by furnishing the geologist with information as to the specific type or types of formation from which the gas is coming, or which type of formation is responsible for a gas "show" in the hot wire detector test, considerable assistance is rendered in determining whether the formation is sufficiently promising to warrant a drill stem test, coring, or the like. Also, minute gas "shows," as in a fractured formation when little or no gas is indicated by the hot wire detector test for either the gas or the mud, may be valuable information for the geologist, since a production zone can occur in such a formation.

It will be further understood that the method of this invention may be carried out by various types or modifications of the apparatus shown, such as different types of vacuum pumps, different positions of the air bleed valve and guage, different types of housings, coasters, microscopes, and different posititons of each. Also, while water is a preferred liquid for immersion of the cuttings, other liquids may be utilized. It will also be understood that other variations may be made in this invention without departing from the spirit and scope thereof.

What is claimed is:

1. A method of detecting gas bearing formations in cuttings and the like, removed from the bore of a well being drilled to penetrate a gas or oil producing formation, such cuttings or the mud by which such cuttings are carried to the surface normally being tested periodically for the presence or absence of combustible gas carried by a sample brought to the surface during a selected increment of time and the types of cuttings contained in a sample normally being identified, which comprises immersing in liquid and in a field of view at least a portion of a sample of such cuttings, which includes cuttings representative of the various formations identifiable as present in the cuttings; sealing such cuttings and liquid from the atmosphere; and removing air from the space about the surface of said liquid so that a successively increasing degree of vacuum is produced on said liquid, whereby gas carried by said cuttings tends to be evolved and is visible as bubbles in said liquid so that those cuttings from which gas evolves and those cuttings from which gas does not evolve may be distinguished, and whereby an indication of whether gas is contained in a possibly productive formation may be obtained.

2. A method of detecting gas bearing formations in cuttings and the like, removed from the bore during drilling of a well, as defined in claim 1, wherein the degree of vacuum finally produced is on the order of a fraction of one pound per square inch absolute.

3. A method of detecting gas bearing formations in cuttings and the like, removed from the bore of a well being drilled to penetrate a gas or oil producing formation, such cuttings or the mud by which such cuttings are carried to the surface normally being tested periodically for the presence or absence of combustible gas carried by a sample brought to the surface during a selected increment of time and the types of cuttings contained in a sample normally being identified, which comprises immersing in liquid and in a field of view at least a portion of a sample of such cuttings, which includes cuttings of a sample shown by other tests to contain combustible gas and representative of the various formations identifiable as present in the cuttings; sealing such cuttings from the atmosphere; and removing air from the space about the surface of said liquid so that a successively increasing degree of vacuum is produced on said liquid, whereby gas carried by said cuttings tends to be evolved and is visible as bubbles in said liquid so that those cuttings from which gas evolves and those cuttings from which gas does not evolve may be distinguished, and whereby an indication of whether gas is contained in a possibly productive formation may be obtained.

4. A method of detecting gas bearing formations in cuttings and the like, removed from the bore of a well being drilled to penetrate a gas or oil producing formation, such cuttings or the mud by which such cuttings are carried to the surface normally being tested periodically for the presence or absence of combustible gas carried by a sample brought to the surface during a selected increment of time and the types of cuttings contained in a sample normally being identified, which comprises immersing in liquid and in a field of magnified view at least a portion of a sample of such cuttings, which includes cuttings representative of the various formations identifiable as present in the cuttings; sealing such cuttings and liquid from the atmosphere; and removing air from the space about the surface of said liquid so that a successively increasing degree of vacuum is produced on said liquid, whereby gas carried by said cuttings tends to be evolved and is visible as bubbles in said liquid so that those cuttings from which gas evolves and those cuttings from which gas does not evolve may be distinguished, and whereby an indication of whether gas is contained in a possibly productive formation may be obtained.

References Cited in the file of this patent

UNITED STATES PATENTS

| | | |
|---|---|---|
| 2,303,655 | Nutter | Dec. 1, 1942 |
| 2,567,215 | Lacks | Sept. 11, 1951 |
| 2,641,922 | Smith | June 16, 1953 |